United States Patent [19]

Furtmayer

[11] Patent Number: 5,144,847
[45] Date of Patent: Sep. 8, 1992

[54] PRESSURE OR FORCE MEASURING DEVICE

[75] Inventor: Kurt Furtmayer, Pfaffenhofen, Fed. Rep. of Germany

[73] Assignee: Johann Zach, Pfaffenhofen, Fed. Rep. of Germany

[21] Appl. No.: 549,006
[22] PCT Filed: Mar. 21, 1989
[86] PCT No.: PCT/EP89/00302
§ 371 Date: Aug. 29, 1990
§ 102(e) Date: Aug. 29, 1990
[87] PCT Pub. No.: WO89/09385
PCT Pub. Date: Oct. 5, 1989

[30] Foreign Application Priority Data

Mar. 24, 1988 [DE] Fed. Rep. of Germany ....... 3809974

[51] Int. Cl.$^5$ .......................... G01L 1/22; G01L 19/02
[52] U.S. Cl. ...................... 73/862.625; 73/769
[58] Field of Search ............... 73/862.67, 765, 769, 73/DIG. 10

[56] References Cited

U.S. PATENT DOCUMENTS 3,201,983 8/1965 Hebert et al. .
4,064,544 8/1986 Konomi et al. .
4,155,265 5/1979 Pickett et al. .
4,422,336 12/1983 Beebe ................... 73/769

FOREIGN PATENT DOCUMENTS 2740685 3/1979 Fed. Rep. of Germany .
2802176 7/1979 Fed. Rep. of Germany .
1519874 2/1968 France .

OTHER PUBLICATIONS

F. L. Crosswy et al, "Dynamic Force Measurement Techniques", Instruments and Control Systems, vol. 43, No. 2, Feb. 1970, pp. 81-83.

Primary Examiner—Charles A. Ruehl
Attorney, Agent, or Firm—Townsend and Townsend

[57] ABSTRACT

A force or pressure sensor has a measuring body exposed to the measuring force and a reference body, said bodies both being supported at the housing via force measuring elements. In an evaluating circuit the signals of the force measuring elements, the second time derivatives of said signals and possibly also their first time derivatives are linked in such a manner that a signal representing the measuring force is obtained which is largely independent of the dynamic inherent behavior of the pressure sensor on shocks and vibrations of the housing and on rapid changes of the measuring force.

14 Claims, 6 Drawing Sheets

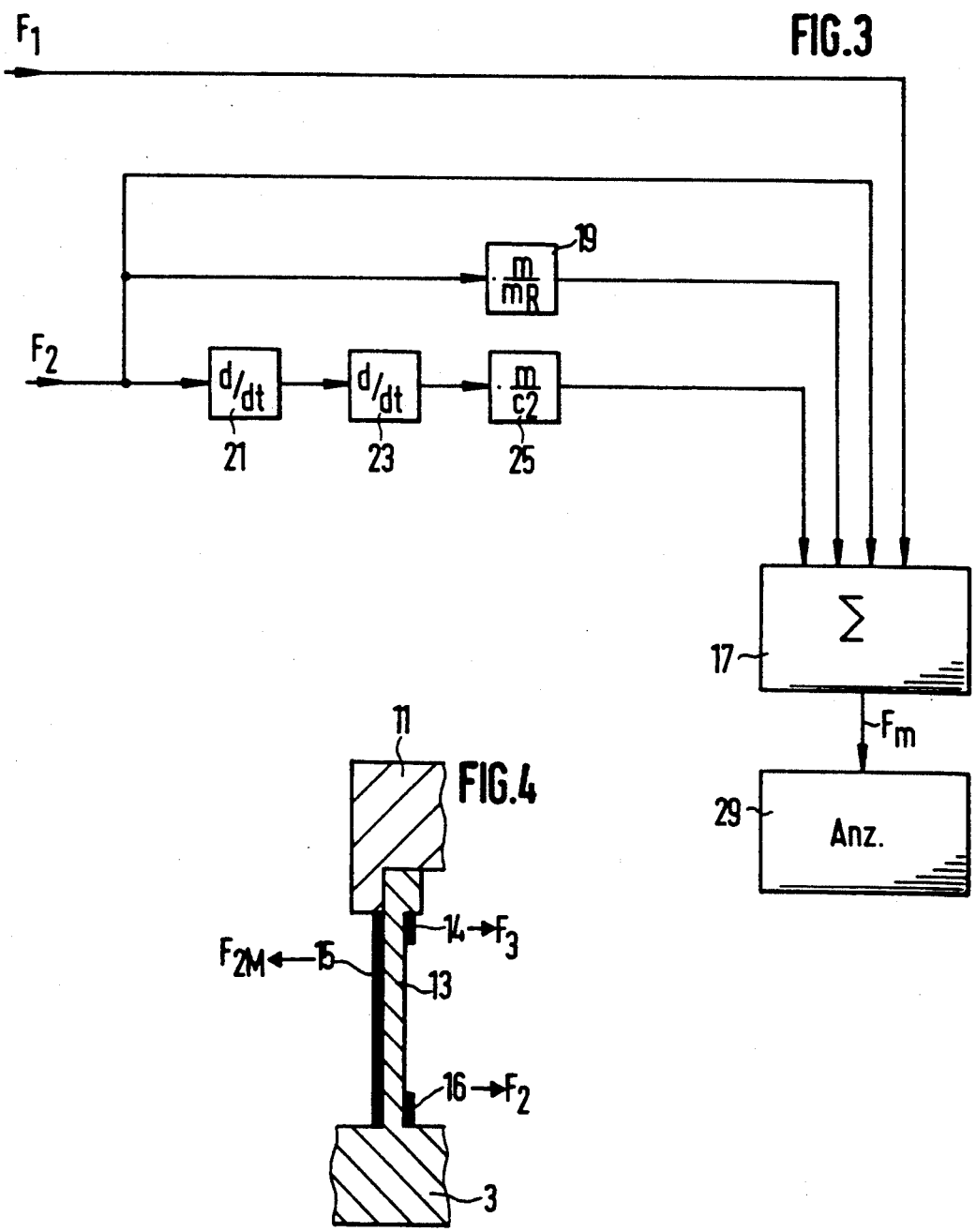

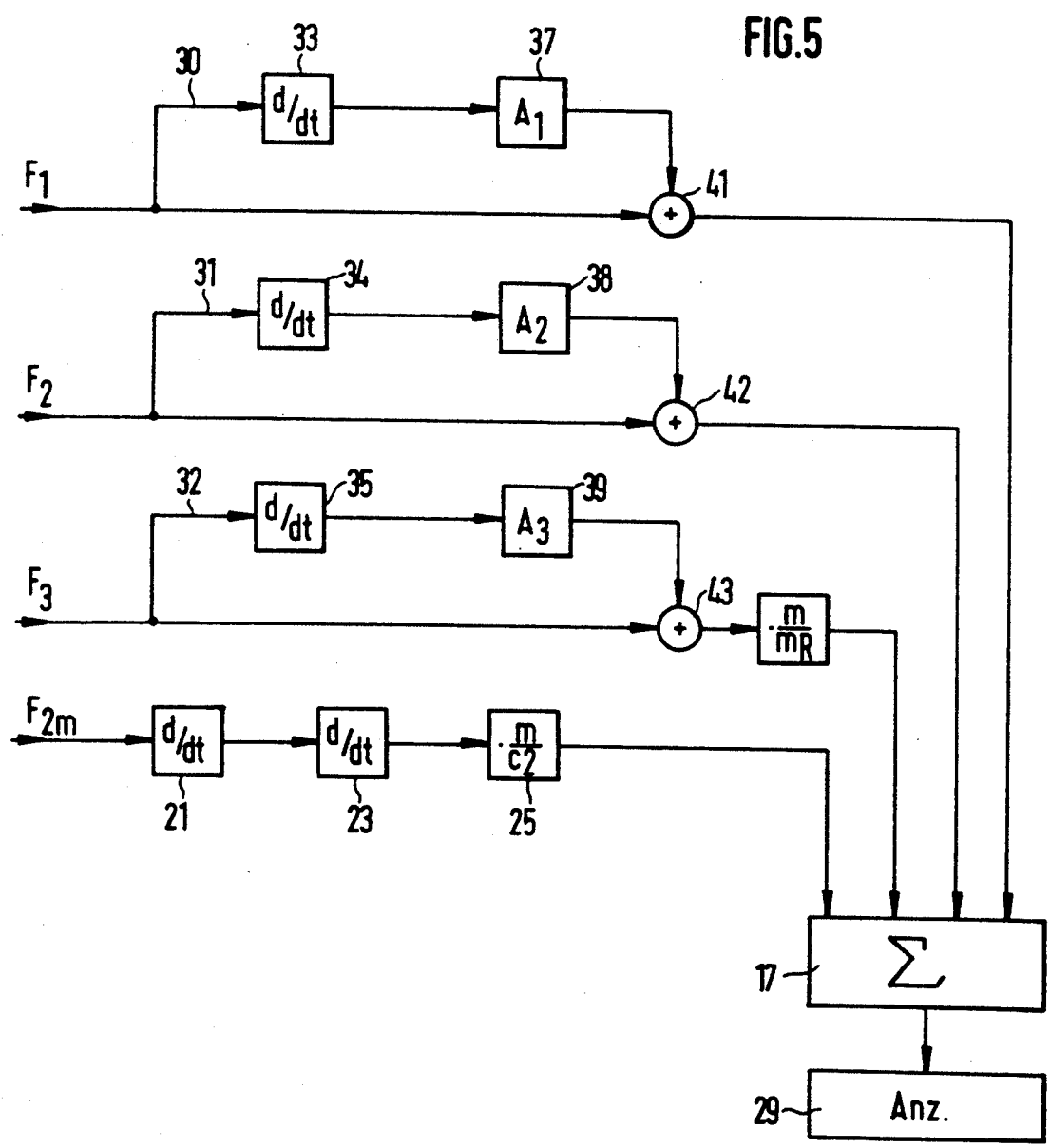

PRESSURE OR FORCE MEASURING DEVICE

DESCRIPTION

The invention relates to a pressure or force measuring device comprising a housing, a measuring body subjected to a measured pressure or measured force, signal generators for generating measuring signals corresponding to the deformation of the body, and an evaluating circuit processing the measuring signal for generating an output signal proportionate to the measuring pressure or measuring force.

When measuring pressures which vary with time, measuring errors occur due to mass accelerations in the mechanical part of such pressure sensors. Pressure shocks, stochastic pressure variations and external disturbances, for example vibrations acting on the housing, lead repeatedly to transient or settling phenomena. During this transient phenomena the measured values indicated have dynamic errors. Fundamentally, due to its construction consisting of the mass of the pressure-influenced part and the return force of the force measuring element acting as spring, the pressure sensor reacts with a dynamic behaviour corresponding to a damped spring-mass system.

DE-PS 694,803 discloses a pressure sensor of the type mentioned at the beginning in which the measuring body subjected to the measured pressure and a reference body are each supported via piezoelectric measuring elements on the housing, the measuring signals of the two force meters being superimposed subtractively on each other. If during a pressure measurement vibration forces act on the housing they are transmitted via the two force measuring elements to the measuring body and reference body and generate equisized and equidirectional signals which cancel each other out so that only the pressure force exerted by the measured pressure on the measuring body is measured. However, fundamentally with this arrangement only the acceleration forces acting on the housing can be excluded from the measurement. Dynamic measuring errors due to sudden changes in the pressure to be measured are not covered. However, even the dynamic components of the forces acting on the housing are completely compensated only if in an ideal case an exactly synchronous movement of measuring body and reference body is assumed on housing vibrations or shocks. Because of unequal masses, material damping, etc., in a real case phase displacements between measuring and reference bodies necessarily occur and falsify the measurement result.

The invention is based on the problem of further developing a pressure or force sensor of the type indicated with the simplest and most economical construction possible in such a manner that a measurement result is obtained which as far as possible is not falsified by the dynamic inherent behaviour of the sensor, in particular on rapidly changing measured pressures or forces.

By the invention, the force components generated by the dynamic spring-mass behaviour of the sensor are detected and compensated in the evaluating circuit so that the measuring signal obtained represents substantially exactly the time profile of the force to be measured. This is done in that by the evaluating means at any instant the dynamic force equilibrium for both masses is calculated at least in simple approximation, and indeed exactly in accordance with the further development.

A further advantage of the invention resides in that the force or pressure sensor can be made substantially without damping. Because of their dynamic behaviour, hitherto usual pressure or force sensors require a damping to minimize as far as possible the influence of the transient or settling phenomena on the measurement result. However, such a damping in the sensor system also suppresses the force peaks of the force profile to be measured and lead in particular with high-frequency pressure or force variations to erroneous measurement. The invention permits a practically damping-free construction of the sensor so that the latter can respond substantially without delay to changes in force or pressure.

Embodiments of the invention will be explained in detail with the aid of the drawings, wherein:

FIG. 3 is the basic scheme of an evaluation for the sensor of FIG. 1;

FIG. 4 is a detail of a modified embodiment of the sensor of FIG. 1;

FIG. 5 is the scheme of an evaluating circuit for the embodiment according to FIG. 4;

Figure 1:
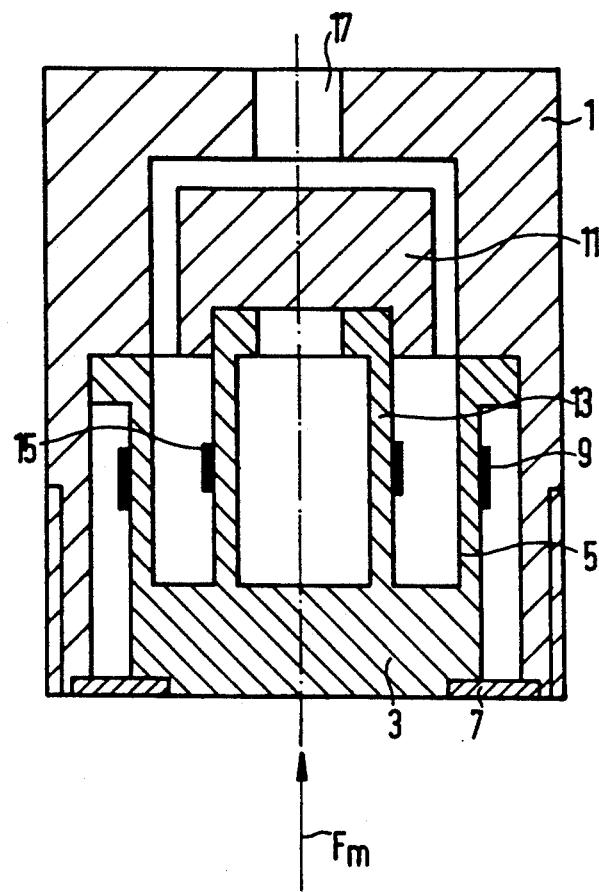
FIG. 1 is a schematic section through a first embodiment of a pressure or force sensor according to the invention.

According to FIG. 1, in a for example cylindrical housing 1 a measuring body 3 is supported by means of a for example tubular first spring-elastic force element 5. Pressure to be measured acts on the end face of the measuring body 3, which is sealed with respect to the housing 1 by means of a diaphragm 7, and exerts a pressure force $F_m$. If the sensor is to be used as force sensor the force $F_m$ to be measured can be transmitted by means of suitable elements to the measuring body 3. The length change of the force measuring element 5 caused by the force $F_m$ can be detected by means of strain gauges 9.

In the interior of the housing 1 a reference body 11 is arranged which is not exposed to the force $F_m$ to be measured. In the embodiment shown it is supported by a second elastic deformable force measuring element 13 with respect to the measuring body 3 and a signal proportional to the change of length of the force measuring element 13 can be tapped off by means of strain gauges 15. Electrical connections of the strain gauges 9, 15 (not shown) can be led out through a bore 17 in the housing 1.

Instead of constructing the force measuring elements 5, 13 as spring elements with strain gauges in the manner illustrated, as known per se they may also be made in the form for example of piezoelectric elements, inductive force pickups and the like.

Figure 2:
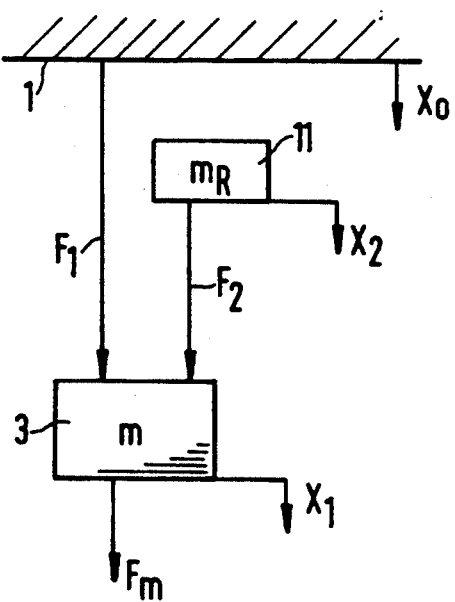
FIG. 2 is a simplified basic sketch of the sensor of FIG. 1 to illustrate the forces occurring on deflections.

In FIG. 2 the forces acting on the housing 1, measuring body 3 and reference body 11 are represented schematically. If the forces measured in the force measuring elements 5 and 13 are denoted by $F_1$ and $F_2$ respectively the masses of the measuring body 3 and reference body 11 by m and $m_r$ respectively and the deflections of the housing 1, measuring body 3 and reference body 11 by $x_0$, $x_1$ and $x_2$ respectively, as indicated in FIG. 1, the following relationships are obtained:

Dynamic equilibrium at the measuring body 3:

$$F_m - F_1 - F_2 = m\, x_1 \qquad (1)$$

Dynamic equilibrium at the reference body 11:

$$F_2 = m_R x_2 \qquad (2)$$

Change of length of the force measuring element 13 between measuring and reference bodies:

$$F_2 = c_2(x_1 - x_2) \qquad (3)$$

wherein $c_2$ is the spring constant of the force measuring element 13.

By twice differentiating equation (3) and combining with (1) and (2) we obtain:

$$F_m = F_1 + F_2\left(1 + \frac{m}{m_R}\right) + F_2 \cdot \frac{m}{c_2} \qquad (4)$$

the last term of which is a correction term for all measuring errors caused by the dynamic inherent behaviour of the sensor.

FIG. 3 shows an example of embodiment for an evaluating circuit with which the signals $F_1$ and $F_2$ tapped off at the first and second force measuring elements 5 and 13 respectively can be processed according to the formula (4) to give the measuring signal corresponding to the force $F_m$ applied. The signal $F_1$ and the signal $F_2$ are supplied directly to a summation member 17. Furthermore, the signal $F_2$ is multiplied in a multiply member 19 by the quotient of the masses m and $m_R$ of the measuring body and reference body and supplied to the summation member 17. Finally, the signal $F_2$ is differentiated twice in two differentiating members 21, 23 and in a multiplication member 25 multiplied by the quotient of the mass m of the measuring body and the spring constant $c_2$ of the second force measuring element 13 and finally supplied to the summation member 17. By summation of the input values the summation member 17 forms an output signal which is proportional to the measured force FM and can be displayed in a display member 29 and/or recorded.

The various computing members of the evaluating circuit need not be formed as separate analog circuit elements as illustrated, it being possible of course to carry out a corresponding digital signal processing of the signals $F_1$ and $F_2$ corresponding to the formula (4) in a microprocessor or similar computer with previous analog-digital conversion of the signals.

In the embodiment described with the aid of FIGS. 1 to 3 the influences of the masses m and $m_R$ of the measuring body and reference body are taken into account. Depending on the design of the sensor and the frequency range to be detected, however, the inherent masses of the force measuring elements 9, 13 can also influence the dynamic behaviour. In this case, in the force balance account must also be taken of the forces originating from the accelerations of the force measuring elements 9, 13. This applies in particular to the force measuring element 13 transmitting the forces between the measuring body 3 and reference body 11.

In FIG. 4 a detail of a modified embodiment of the sensor according to FIG. 1 is shown in which with additional strain gauges 14, 16 the forces $F_2$ and $F_3$ transmitted by the force measuring element 13 to the measuring body 3 and the reference body 11 respectively can be measured separately. The strain gauge 15 extends over the entire spring length of the force measuring element 13 and detects the force $F_{2M}$ corresponding to the relative movement of the measuring body 3 and reference body 11. The inequality of the forces $F_2$ and $F_3$ is due to the mass inertia of the force measuring element 13 on acceleration.

For the embodiment of FIG. 4 the aforementioned equations (1) to (4) are to be amended as follows:

$$F_m - F_1 - F_2 = m \cdot x_1 \qquad (1')$$
$$F_3 = m_R\, x_2 \qquad (2')$$
$$F_{2M} = c_2 (x_1 - x_2) \qquad (3')$$
$$F_m = F_1 + F_2 + F_3 \cdot \frac{m}{m_R} + F_{2M} \cdot \frac{m}{c_2} \qquad (4')$$

FIG. 5 shows the scheme of an evaluating circuit which links the force signals $F_1$, $F_2$, $F_3$ and $F_{2M}$ according to equation (4') and also takes account of the material damping, inevitable in the system, in the spring bodies. It is assumed here that a corresponding damping force $D_1$, $D_2$, $D_3$ must be added to each of the respective forces $F_1$, $F_2$, $F_3$, each damping force depending in accordance with the formula $$D_i = k_i x_i \qquad (5)$$

on the respective material damping constant $K_i$ and the differential $\dot{x}_i$ with respect to time of the deflection $x_i$, the latter in turn in accordance with the formula $$x_i = \frac{F_i}{c_i} \qquad (6)$$

being equal to the quotient of the force $F_i$ and the spring constant $c_i$. If the axial length $l_{DMS}$ of the respective strain gauge is smaller than the length $l_k$ of the associated force measuring element (spring body), the local detection detected by the strain gauge is $$x_{i,o} = \frac{F_i}{c_i} \cdot \frac{l_{DMS,i}}{l_{K,i}} \qquad (6a)$$

and the local damping force is obtained from (6a) and (5) as follows:

$$D_{i,o} = F_i \cdot \frac{K_i}{c_i} \cdot \frac{l_{DMS,i}}{l_{K,i}} \qquad (5a)$$

Putting $$A_i = \frac{K_i}{c_i} \cdot \frac{l_{DMS,i}}{l_{K,i}} \qquad (7)$$

then instead of the formula (4') the formula extended by the damping forces is obtained:

$$F_m = F_1 + A_1F_1 + F_2 + A_2F_2 + \qquad (4''')$$
$$\frac{m}{m_R} \cdot F_3 + \frac{m}{m_R} \cdot A_3F_3 + \frac{m}{c_2} \cdot F_{2M}$$

In the evaluating circuit of FIG. 5 the damping forces are taken into account by additional circuit branches 30, 31, 32 with differentiating members 33, 34, 35 and multiplier members 37, 38, 39 as well as summation members 41, 42, 43.

If for example when using very low-damping force measuring elements there is no need to take account of the damping forces, by omitting the circuit branches 30, 31, 32 from FIG. 5 a simplified evaluating circuit is obtained for the embodiment according to FIG. 4.

Figure 6:
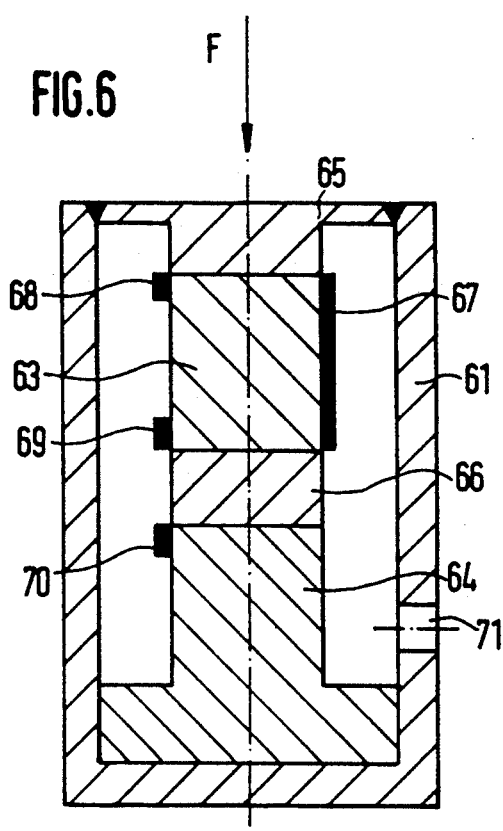
FIG. 6 shows in an illustration similar to FIG. 1 a section through a modified embodiment of the pressure or force sensor.

FIG. 6 shows a modified embodiment of the pressure or force measuring device. In this embodiment the measuring body 65 on which the pressure force F acts is supported via the force measuring element 63 with respect to the reference body 66 and the latter in turn via the second force measuring element 64 with respect to the housing 61. The force measuring elements 63, 64 here are not tubular but are made from solid material; they can however expediently be made from a material different to the measuring body 65 and reference body 66. The deformations of the force measuring elements 63, 64 which occur on relative movements of measuring body 65 and reference body 66 with respect to each other and with respect to the housing 61 and are proportional to the forces then occurring may be detected by means of strain gauges 67, 68, 69, 70. The signal lines originating from the latter (not illustrated) can be led out of the housing 61 through a bore 71.

Figure 7A:
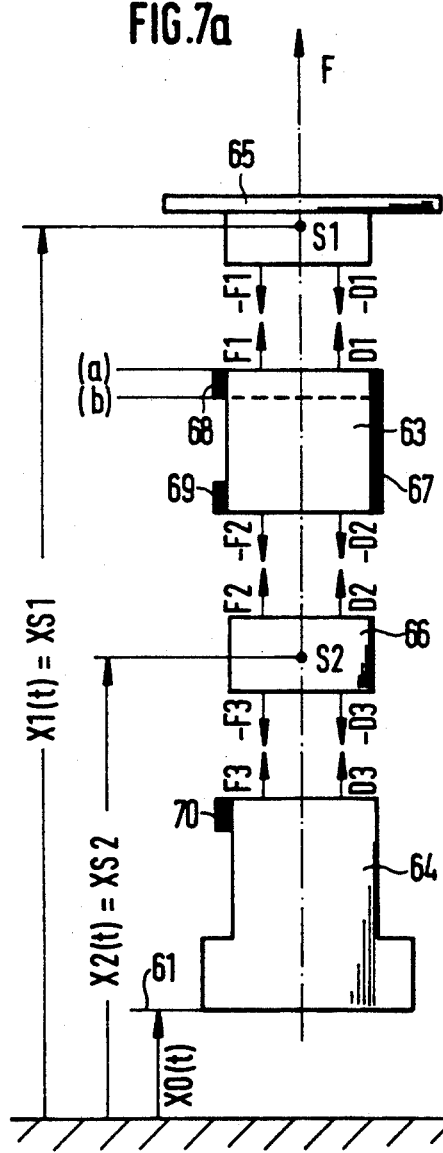
FIG. 7a is a separate illustration of the components of the sensor of FIG. 6
Figure 7B:
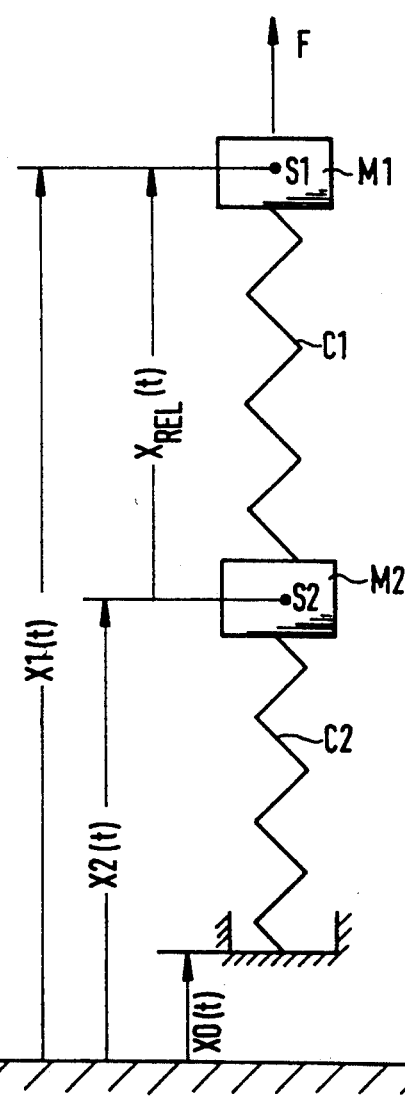
FIG. 7b is the associated basic sketch for deriving the force equations.

In FIG. 7a the components of the pressure sensor of FIG. 6 are illustrated separately. The deformation forces $F_1$, $F_2$, $F_2$, acting at the interfaces between the individual components, the damping forces D1, D2, D3 and the corresponding deflection coordinates X1, X2 for the mass centres $S_1$, $S_2$ of gravity and X0 for the housing are indicated. The masses of the measuring body 65 and reference body 66 will be denoted by M1 and M2. Application of the mass centre of gravity law of mechanics then gives the following relationships:

Dynamic equilibrium for mass M1 and M2:

$$F - F1 - D1 = M1 \cdot X1 \qquad (11)$$

$$F2 + D2 - F3 - D3 = M2 \cdot X2 \qquad (12)$$

Kinematic relationship between the masses M1 and M2:

$$X1 = X2 + Xrel \qquad (13a)$$

$$X1 = X2 + Xrel \qquad (13)$$

The equation (13) is generally known as "absolute acceleration = guide acceleration + relative acceleration", applied to the movement between the masses M1 and M2.

If after appropriate transformation the terms (13) and (12) are inserted into the term (11), we have:

$$F = F1 + D1 + (M1/M2) \cdot (F2 + D2 - F3 - D3) + M1 \cdot X_{rel} \qquad (14)$$

the last term of which represents a correction term for all the measuring errors caused by the dynamic inherent behaviour of the sensor.

According to FIG. 7a, the forces F1, F2 and F3 are detected by the strain gauges 68, 69 and 70. The gauge strips should be as short as possible to ensure an exact determination, based on the derivative, of the forces acting in the transition cross-sections of the spring bodies 63, 64 and the masses 65, 66.

Figure 8:
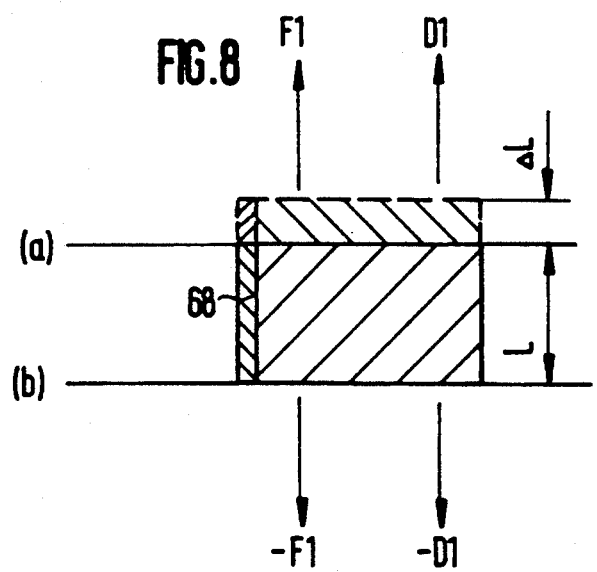
FIG. 8 is a sketch for taking account of the damping forces.

The (inner) material damping forces D1, D2 and D3 are derived in the force measuring elements in accordance with FIG. 8. The force F1 acts on the section illustrated of the force measuring element 63 of length L, which is equal to the length of the strain gauge 68, and generates the change of length $$\Delta L = F1/C1 \qquad (15)$$

wherein C1 is the spring constant of the length section L. The deformation gives rise to the damping force D1 which is proportional to the deformation rate:

$$D1 = \frac{d(\Delta L)}{dt} \cdot K1 \qquad (16)$$

wherein K1 is a material damping constant. It follows from (15) and (16) that $$D1 = \frac{d(F1)}{dt} \cdot A1 \qquad (17)$$

wherein $A1 = K1/C1$ is a constant. Equation (17) applies analogously to the damping forces D2 and D3 at the location of the strain gauges 69 and 70.

The correction term $M_1 \cdot X_{rel}$ of equation (14), which takes account of the acceleration of the mass centres S1, S2 of gravity relatively to each other, can be derived from the measuring signal of the strain gauge 67 as follows. Said output signal can be put equal to a force $F_M$ which in the force measuring element 63 of length $L_M$ results in the change in length $\Delta L_M$:

$$F_M = \Delta L_M \cdot C_M \qquad (18)$$

wherein $C_M$ is the spring constant of the force measuring element over the length $L_M$ thereof. Neglecting any deformations in the measuring body 65 and reference body 66 itself, $\Delta L_M = X_{rel}$, and thus $$X_{rel} = F_M / C_M \qquad (19)$$

By inserting (17) and (19) in (14) we have:

$$F = F1 + A1 \cdot F1 + (M1/M2) \cdot (F2 + A2F2 - F3 - A3 \cdot F3) + (M1/C1) \cdot FM \qquad (20)$$

wherein F1, F2, F3 and $F_M$ are the measuring signals of the strain gauges 67, 68, 69, 70 and A1, A2, A3, M1, M2 and C1 are constants.

This equation (20) describes the movement of the masses M1 and M2 under the action of the force F(t). The force F(t) acting at the instant t is calculated from the motion of the masses.

Figure 9:
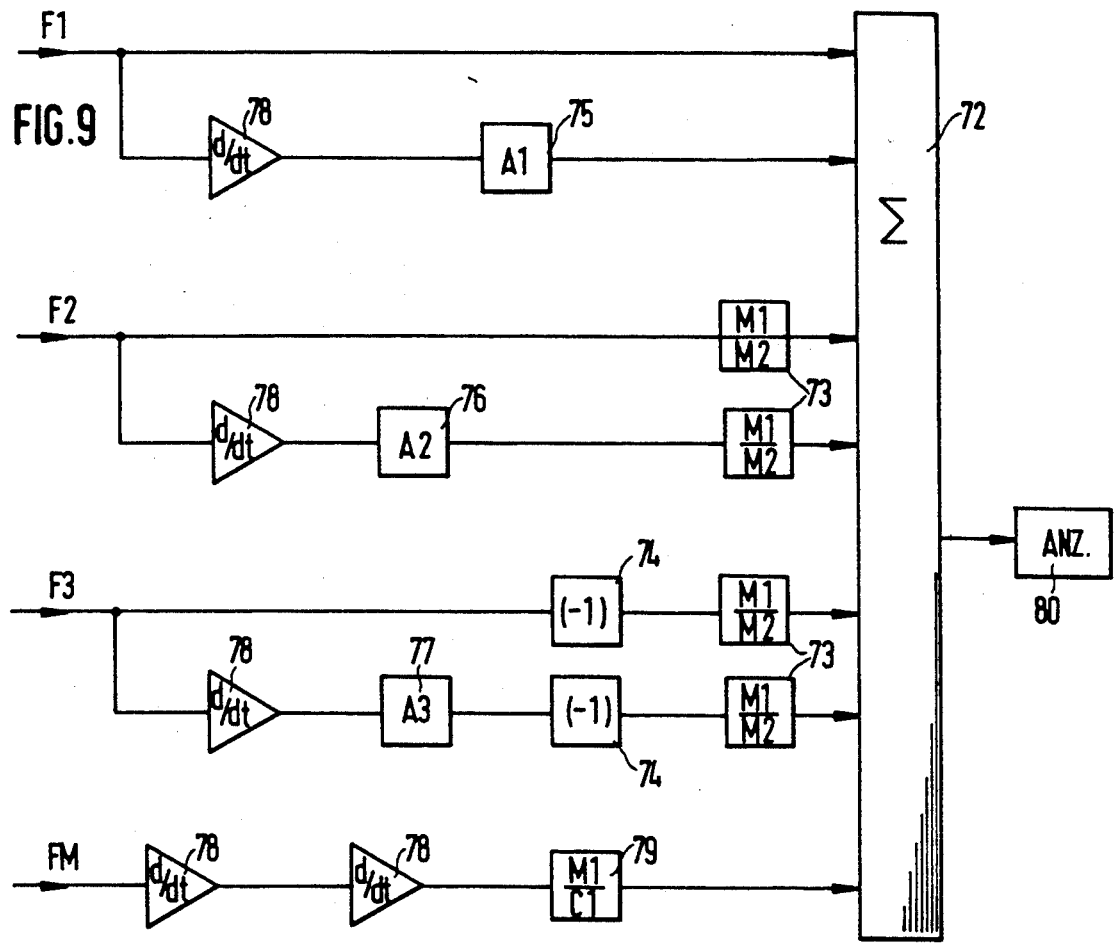
FIG. 9 shows the scheme of an evaluating circuit for the embodiment of FIG. 6.

FIG. 9 shows an example of embodiment for an evaluating circuit with which the tapped-off signals F1, F2, F3 and FM can be processed corresponding to the formula (20). The signal F1 is supplied directly to a summation member 72, the signal F2 is supplied thereto after multiplication by the ratio of the two masses M1 and M2 in the multiplier 73 and the signal F3 is supplied thereto after sign reversal in the inverter 75 and multiplication in 73. The damping forces are determined by the circuit branches with differentiating members 78, multiplier members 75, 76, 77, D2 and D3 and additionally with multiplication in 73 and D3 inverted in 74, and supplied to the adder 72. The relative acceleration is calculated from the signal FM by differentiation twice in 78 and subsequent multiplication in 79 and added in the adder 72 to the other terms of the equation (20). The summation of the input values in the adder gives a signal proportional to the force F and is displayed in the display member 80.

In this case as well, instead of the evaluating circuit with separate analog circuit elements, a corresponding digital signal processing is possible in accordance with formula (20) in a microprocessor or similar computer, with previous analog-digital conversion of the signals.

In this case as well, if there is no need to take account of the damping forces, the evaluation can be simplified by omitting the circuit and computing branches with the members 75, 76, 77.

The above derivation of equation (20) is based on the simplified assumption that a resilient deformation occurs only in the force measuring elements 63, 64 and not in the masses 65, 66. In reality, by deformations within the measuring body 65 and the reference body 66 additional displacements of the centres S1 and S2 of gravity thereof can occur which are not detected by the strain gauge 67. With extreme measuring accuracy this can lead to erroneous detection of the relative movements.

To minimize this error, constructional steps should be taken to ensure that the deformations within the measuring body 65 and reference body 66 are small compared with the deformations in the force measuring elements 63 and 64. In the embodiment according to FIG. 6 this can be done by suitable choice of materials with very different elasticity moduluses for the force measuring elements 63, 64 on the one hand and the measuring body 65 and reference body 66 on the other hand.

Figure 10:
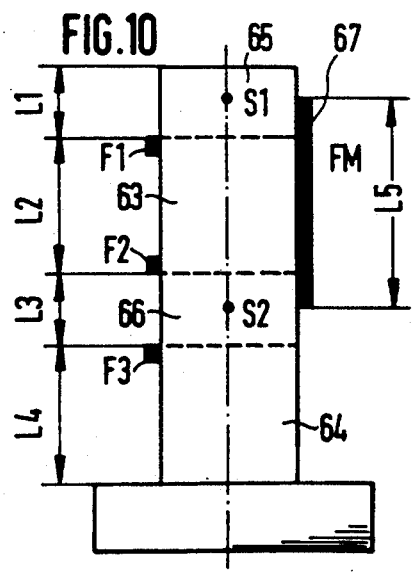
FIGS. 10 and 11 show two modified embodiments of the pressure sensor according to FIG. 6.
Figure 11:
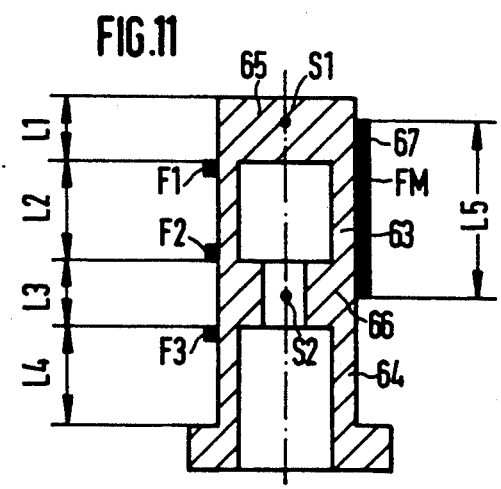

In accordance with FIGS. 10 and 11, however, the measuring body 65 and reference body 66 may also be integrally formed with the force measuring elements 63, 64 and consist of the same material as the latter. In accordance with FIG. 10 this then simply gives different portions of a uniform cylindrical body whilst in accordance with FIG. 11 the force measuring elements 63, 64 have a higher deformability due to a thin-walled tubular configuration. In both cases it is advantageous for the strain gauge 67 detecting the relative movement between the measuring and reference body to have a length L5 which is greater than the length L2 of the force measuring element 63 and corresponds to the distance between the centres S1 and S2 of gravity of the measuring and reference bodies.

The embodiments of FIGS. 6, 10 and 11 have basically only a single rod-like body exposed to the measuring force F and supported against the housing. Said body is divided over its length into various portions, i.e. the first mass portion or measuring body 65 on which the force F acts, a first deformation portion or force measuring element 63, a second mass portion or reference body 66 and a second deformation portion or force measuring element 64. Signal generators in the form of elongation measuring strips or strain gauges are attached to the deformation portions 63, 64 at least at the points where the latter adjoin the mass portions 65, 66. It is not absolutely essential for the deformation portions 63, 64 to differ from the mass portions 65, 66 in their deformability. Consequently, the entire body may consist in accordance with the embodiment of FIG. 10 of a uniform material of constant cross-section, the borders between the mass portions 75, 76 and the deformation portions 63, 64 being defined only by the position of the strain gauges.

However, it is more advantageous for the deformation portions 63, 64 to have a higher deformability than the mass portions 65, 66. For this purpose, in accordance with FIG. 6 the entire rod-like body may be made up of portions of different material with different elasticity properties. Alternatively, it is also possible for the entire rod-like body to consist integrally of the same material which is however treated sectionwise so that it has different deformation properties. For example, the embodiment may consist of plastic having different Shore hardness in sections. The greater deformability of the deformation portions 63, 64 may then also be achieved by appropriate shaping so that said portions have a smaller cross-section than the mass portions 65, 66, for example by the tubular configuration shown in FIG. 11. Said steps of material choice and configuration may also be combined with each other.

To make the measuring device as insensitive as possible to lateral deformation or accelerating forces, in the embodiment according to FIG. 6 for example the reference body or second mass portion 66 may be supported laterally with respect to the housing 61 by a diaphragm, the latter being easily deformable in the direction of the measuring force F but as stiff as possible in the direction perpendicular thereto.

I claim:

1. Pressure of force measuring device comprising a housing (1),
   a measuring body (3) subjected to the measured pressure or measured force,
   a reference body (11) not subjected directly to the measured pressure or measured force,
   a first elastically deformable force measuring element (13) via which the measuring body (3) and the reference body (11) are supported with respect to each other,
   a first signal generator (15) for generating a measuring signal corresponding to the deformation of the first force measuring element (13),
   a second elastically deformable force measuring element (5) via which the measuring body or the reference body is supported deflectably with respect to the housing,
   a second signal generator (9) for generating a measuring signal corresponding to the deformation of the second force measuring element (5),
   and an evaluating circuit processing the measuring signals from the two force measuring elements (5, 13),
   characterized in that the evaluating circuit comprises computing members (21, 23, 17) for forming the second time differential of the measuring signal from the first signal generator (15) and for additively combining of said second time differential with the undifferentiated measuring signals of the first and second signal generators (9, 15).

2. Device according to claim 1, characterized in that the evaluating circuit additionally comprises computing members (31, 33, 35) for forming the first time differential of the measuring signals to take account of the damping behaviour of the device.

3. Device according to claim 1, characterized in that at least on one of the force measuring elements (13) two signal generators (14, 16) are arranged in the vicinity of opposite ends of said one force measuring element (13).

4. Measuring device according to claim 3, characterized in that in addition a signal generator or pickup (15) extending over the entire length said one of the force measuring element (13) is provided.

5. Device according to claim 1, characterized in that the measuring body is supported by the first force measuring element with respect to the reference body and the latter is supported by the second force measuring element with respect to the housing.

6. Measuring device according to claim 5, characterized in that the measuring body, reference body and force measuring elements are made integrally from the same material.

7. Device according to claim 1, characterized in that the force measuring elements, by different material or different configuration, have a higher deformability than the measuring body and the reference body.

8. Pressure or force measuring device comprising a rodlike or block-like body, the one end face of which is subjected to the measuring pressure or the measuring force and the other end face of which is supported with respect to a housing, signal generators for generating measuring signals corresponding to the deformation of the body, and an evaluating circuit processing the measuring signals for generating an output signal proportional to the measuring pressure or measuring force, characterized in that the body comprises the following portions over its length: a first mass portion (65) of predetermined mass and subjected to the measuring pressure or measuring force (F), a first elastically deformable deformation portion (63), a second mass portion (66) of predetermined mass, and a second elastically deformable deformation portion (64), that on the first and second deformation portions (63, 64) in each case at least one signal generator (67, 68, 69, 70) formed as a strain gauge is arranged and that the evaluating circuit comprises computing members (21, 23, 17) for forming the second time differential of the measuring signals of said one signal generator (67) of the first deformation portion (63) and for additively combining of said second time differential with the undifferentiated measuring signals of the signal generators of the two deformation portions (63, 64).

9. Apparatus according to claim 8, characterized in that at least one said signal generator extends only over a small portion of the length of each deformation portion (63, 64) and is arranged at the boundary between the respective deformation portion (63, 64) and the adjoining mass portion (65, 66).

10. Apparatus according to claim 8, characterized in that at least the first deformation portion (63) comprises one of said signal generator (67) which extends over at least the entire length of the deformation portion (63).

11. Device according to claim 10, characterized in that the one of said signal generator (67) extends over the entire length distance between the mass centres (S1, S2) of gravity of the first and second mass portions (65, 66).

12. Device according to claim 8, characterized in that the first and second deformation portions (63, 64) due to a smaller cross-sectional area have a higher deformability than the first and second mass portions (65, 66).

13. Device according to claim 8, characterized in that the first and second deformation portions (63, 64) consist of a material of higher elastic deformability than the first and second mass portions (65, 66).

14. Device according to claim 8, characterized in that the first and second deformation portions (63, 64) have the same deformability and the same cross-section as the first and second mass portions and the borders between the deformation portions and the mass portions are defined by the position of at least one of said signal generators (68, 69, 70).

* * * * *